United States Patent [19]

Amin

[11] Patent Number: 5,763,053

[45] Date of Patent: Jun. 9, 1998

[54] AMBIENT LIGHTED PLAQUE STRUCTURE WITH SELF-CREATED AESTHETIC ILLUSORY-COLORED SIDES AND PROCESS OF MAKING SAME

[76] Inventor: Harshad N. Amin, 38 St. John Dr., Hawthorn Wood, Ill. 60047

[21] Appl. No.: 591,021

[22] Filed: Jan. 25, 1996

[51] Int. Cl.⁶ .................................................. B32B 9/00
[52] U.S. Cl. .................... 428/195; 428/13; 428/15; 428/34; 428/34.4; 428/46; 428/105; 428/192; 428/426; 428/428; 428/913.3; 52/79.1; 52/104; 52/105
[58] Field of Search ................ 428/13, 46, 428, 428/15, 913.3, 34, 95, 192, 34.4, 420, 105; 52/105, 79.1, 104

[56] References Cited

U.S. PATENT DOCUMENTS 5,137,761  8/1992  Altmayer ................... 428/13

*Primary Examiner*—Patrick Ryan
*Assistant Examiner*—Abraham Bahta
*Attorney, Agent, or Firm*—Meroni & Meroni

[57] ABSTRACT

An ambient lighted plaque structure with self-created aesthetic illusory-colored sides comprising a glass blank. The glass blank being colorless and transparent and homogeneous in composition. The glass blank bounded by front and back surfaces and a series of angularly related sides where the series of angularly related sides define a thickness between the front and back surfaces of the glass blank. One of the series of angularly related sides facing in an upward direction. Another of the series of angularly related sides facing in a downward direction. A colored glass strip structure underlying the glass blank and being homogeneous in composition. The colored glass strip structure is rigidly bonded to the side facing in a downward direction and the bond provides a colorless transparent joint therebetween. The joint enables ambient light to travel between the colored glass strip structure and the side facing in a downward direction without substantial internal reflection. The colored glass strip structure is sized to substantially cover the side facing in a downward direction. Then, the side facing in an upward direction is aesthetic illusory-colored when ambient light from an independent light source passes into the glass blank and reflects off of the colored glass strip structure and refracts externally of the side facing in an upward direction causing said side to be aesthetic illusory-colored and said ambient light leaving the front and back surfaces of the glass blank having a colorless transparent read through capacity from the front surface to the back surface.

26 Claims, 5 Drawing Sheets

AMBIENT LIGHTED PLAQUE STRUCTURE WITH SELF-CREATED AESTHETIC ILLUSORY-COLORED SIDES AND PROCESS OF MAKING SAME

BACKGROUND OF THE INVENTION

1. Field of the Invention

The present invention relates generally to a plaque structure, name plate, trophy or the like and the illusion of the plaque structure, name plate, trophy or the like having aesthetic colored sides.

More specifically, the present invention concerns a plaque structure or the like comprising a colorless transparent glass blank and a colored glass strip structure rigidly bonded to a side of the glass blank whereby a transparent joint is created therebetween. This transparent joint is essential in that when ambient light from an independent light source travels through the glass blank it is now able to pass out of the glass blank, through the transparent joint and into the strip structure without the prior art effect of near total internal reflection of the ambient light which had prevented any ambient light from reaching the strip structure in the first place. Then, established principles of light mechanics explain that some of the ambient light that reaches the strip structure is reflected back through the transparent joint, through the glass blank and then refract out of the sides of the glass blank. The refracted ambient light causes the sides of the glass blank to be aesthetic illusory-colored with the color of the strip structure, where, the illusory-colored sides are not actually physically colored but only appear colored to an observer.

2. Description of the Prior Art

My invention is now made possible because only recently has there been a colorless transparent bonding glue available to bond two pieces of glass together and forming an essential colorless transparent joint therebetween. Without this special transparent bonding glue, glass cannot be bonded to glass in a cold bonding process and resulting in a colorless transparent bond therebetween. In fact, prior art processes involving the bonding of two distinct glass pieces required a hot fusion process, usually performed during the manufacture of a glass piece itself. The hot process of fusing one glass piece to another is thus old in the art of glass making but the hot process is very costly and creates a product rarely affordable by the average consumer. My present invention allows manufacture at room temperature, using ordinary materials and thus more economically producing a product that is now available to the average consumer at an affordable price.

Also important to my invention and, not available in the prior art, is the use of an all glass plaque structure of the type described and claimed herein. Such an all glass plaque structure is brilliant with its polish finished surfaces and colorless transparent read through capacity. Another advantage of an all glass plaque structure is its perceived value in the marketplace and its superior scratch resistant surfaces when compared to other transparent type materials.

Prior art devices teach various ways of enhancing the aesthetic appearance of a block of glass or the like. One such way is disclosed in U.S. Pat. No. 5,333,427 by inventor James M. Uhlik. This patent discloses a decorative utilitarian glass block, of the type used in a building wall structure, which utilizes a color paint coating which is dissimilar to the color of the block to thereby provide an aesthetic different color effect. One problem with coloring glass in this way is that over time the painted surface is subject to the elements, scratching and other ordinary wear and tear that will flaw the colored surface. Further, for each colored surface desired, it must be individually painted. Also, such a coloring method does not utilize the natural aesthetic beauty of the glass itself but rather merely uses the glass as a vehicle to provide a surface on which to put a paint coating, if desired.

My invention, on the other hand, utilizes the natural transparent beauty of the glass to create a plaque structure with self-created aesthetic illusory-colored sides. In one embodiment, my invention provides an actual color strip structure along only one side of the plaque structure. This single color strip structure is sufficient to cause all the other sides of the plaque structure to be illusory-colored without actually have any physical color structure placed at these sides. Thus, my invention reduces material costs and manufacturing costs and provides a superior product to the painted glass prior art devices.

Yet another way prior art devices have tried to achieve an aesthetic colored plaque structure or the like has been to use a glass blank colored homogeneously throughout the blank itself. To do this one must obtain a more expensive colored glass blank which is colored during the manufacture of the glass itself. Moreover, if the glass blank is engraved upon, the homogenous colored glass diminishes the read through capacity of the glass blank and any engraved indicia are more difficult to perceive than indicia on a colorless glass blank.

It is a particular feature of my invention to impart color only at the illusory-colored sides without affecting the colorless transparent glass blank or the engraving thereon, if any. In this manner the illusory-colored sides do not diminish the read through capacity of the colorless transparent glass blank. Moreover, any engraved indicia are easier to perceive than indicia on a prior art colorless transparent glass blank without illusory-colored sides or a prior art homogenous colored transparent glass blank, because, the illusory-colored sides of my colorless transparent glass blank in effect outline the plaque structure and draw an observer's eye within the translucent colored outline toward the center of the plaque where any indicia may be engraved. Thus, the superior feature of providing a colorless transparent glass blank is now combinable with the superior feature of transparent colored sides to create a superior "eye-catching" yet easily readable plaque structure or the like.

Further, the construction of my plaque structure creating the illusory-colored sides is more simple and versatile than prior art devices. Now a universal colorless transparent glass blank need be combined with only one colored glass strip structure to provide the illusory-colored sides. Moreover, the universal colorless transparent glass blank can be combined with any number of different colored glass strip structures to obtain a particular color for the illusory-colored sides, where the same economical and readily available colorless transparent glass blank will be used for each plaque structure.

These and other types of glass coloring devices or methods disclosed in the prior art do not offer the flexibility and inventive features of my ambient lighted plaque structure with self-created aesthetic illusory-colored sides and process of making same. As will be described in greater detail hereinafter, the ambient lighted plaque structure with self-created aesthetic illusory-colored sides and process of making same of the present invention differs from those previously proposed.

SUMMARY OF THE INVENTION

According to my present invention I have provided an ambient lighted plaque structure with self-created aesthetic illusory-colored sides comprising: a glass blank; the glass blank being colorless and transparent and being homogeneous in composition; the glass blank bounded by front and back surfaces and a series of angularly related sides; the series of angularly related sides defining a thickness between the front and back surfaces thereof; one of the series of angularly related sides facing in an upward direction; another of the series of angularly related sides facing in a downward direction; a colored glass strip structure underlying the glass blank; the colored glass strip structure being homogeneous in composition; bonding means for rigidly bonding the colored glass strip structure to the side facing in a downward direction; the bonding means providing a colorless transparent joint between the colored glass strip structure and the side facing in a downward direction, the colorless transparent joint enabling ambient light to travel between the colored glass strip structure and the side facing in a downward direction without substantial internal reflection as the ambient light travels between the colored glass strip structure and the side facing in a downward direction; the colored glass strip structure sized to substantially cover the side facing in a downward direction; and, the side facing in an upward direction being aesthetic illusory-colored when ambient light from an independent light source passes into the glass blank and reflects off of the colored glass strip structure and refracts externally of the side facing in an upward direction causing the side to be aesthetic illusory-colored and the ambient light leaving the front and back surfaces of the glass blank having a colorless transparent read through capacity from the front surface to the back surface.

Another feature of my invention relates to the bonding means comprising a liquid glue curable at room temperatures in the range of 60 degrees F. to 80 degrees F., the glue when cured forming the colorless transparent joint enabling ambient light to travel between the colored glass strip structure and the side facing in a downward direction without substantial internal reflection as the ambient light travels between the colored glass strip structure and the side facing in a downward direction.

Still another feature of my invention concerns a plaque structure wherein a support structure comprising a base member is rigidly attached to a bottom portion of the colorless transparent glass blank in stacked relation underlying the colored glass strip structure, the base member being substantially perpendicular to the front and back surfaces of the glass blank, and the base member being a material from the group consisting of glass, crystal and wood.

According to important features of my invention I have also provided an plaque structure wherein indicia are engraved on one of the back and front surfaces of the glass blank.

Yet another feature of my invention I have provided is a plaque structure wherein a beveled edge traverses a length of one of the series of angularly related sides, the beveled edge lying between the side and a respective front or back surface of the glass blank, the beveled edge being aesthetic illusory-colored when ambient light from an independent light source passes into the glass blank and reflects off of the colored glass strip structure and refracts externally of the beveled edge causing said beveled edge to be aesthetic illusory-colored and said ambient light leaving the front and back surfaces of the colorless transparent glass blank having a colorless transparent read through capacity from the front surface to the back surface.

According to still further features of my invention I have also provided a process of making an ambient lighted plaque structure with self-created aesthetic illusory-colored sides, the plaque structure utilizing light from an independent light source to create aesthetic illusory-colored sides, comprising the steps of: providing an unfinished colorless transparent glass blank bounded by front and back surfaces and a series of angularly related sides; finishing one of the series of angularly related sides to create a downward side having a uniform flatness across the surface; applying a bead of glass-type bonding glue longitudinally across the downward side; placing the colorless transparent glass blank on top of a colored glass strip structure, the glue being located in between the downward side and the colored glass strip structure; creating a continuous joint by applying pressure to said colorless transparent glass blank sufficient to cause the glue to ooze out from between the downward side and the colored glass strip structure eliminating substantially all air bubbles from being located in the glue; curing the glue to cause the joint to be colorless and transparent and create a rigid bond between the downward side and the colored glass strip structure and thereby enabling light from an independent light source to travel between the colored glass strip structure and the colorless transparent glass blank without substantial internal reflection as the ambient light travels between the colored glass strip structure and the colorless transparent glass blank thereby self-creating the aesthetic illusory-colored sides of the colorless transparent glass blank and leaving the front and back surfaces of the colorless transparent glass blank having a colorless transparent read through capacity from the front surface to the back surface; and, machining rough edges of the colored glass strip structure to be flush with respective front and back surfaces and respective sides of the series of angularly related sides.

Still other features of my invention I have also provided in my process are the steps of: curing the glue by exposing the glue between the downward side and the colored glass strip structure to ultraviolet light for a predetermined time period at room temperatures in the range of 60 degrees F. to 80 degrees F.; cleaning off the glue that oozed out from between the downward side and the colored glass strip structure; imparting a polished finish to the front and back surfaces and the series of angularly related sides of the colorless transparent glass blank; beveling an edge located between one side of the series of angularly related sides and the front surface of the colorless transparent glass blank, thereby causing the beveled edge to be aesthetic illusory-colored when ambient light from the independent light source passes into the colorless transparent glass blank and reflects off of the colored glass strip structure and refracts externally of the beveled edge and leaving the front and back surfaces of the colorless transparent glass blank having a colorless transparent read through capacity from the front surface to the back surface; engraving indicia on one of the front and back surfaces; and, assembling a base member with the colorless transparent glass blank and the colored glass strip structure in stacked relation therewith, the base member underlying the colored glass strip structure and thereby supporting a bottom portion of the colorless transparent glass blank in a substantially perpendicular position relative to the base member.

Other objects, features and advantages of my invention will become more readily apparent upon reference to the following description when taken in conjunction with the accompanying drawings, which drawings illustrate several embodiments of my invention.

DETAILED DESCRIPTION OF THE PREFERRED EMBODIMENT

Figure 1:
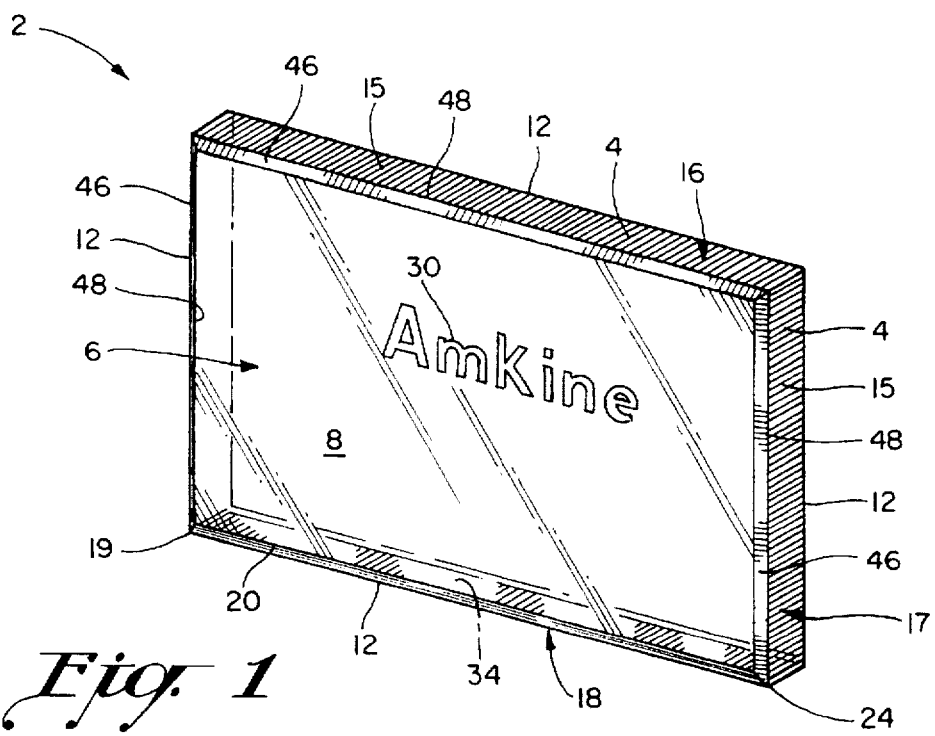
FIG. 1 is a front perspective view of a preferred embodiment of my plaque structure without a separate base member attached thereto.
Figure 2:
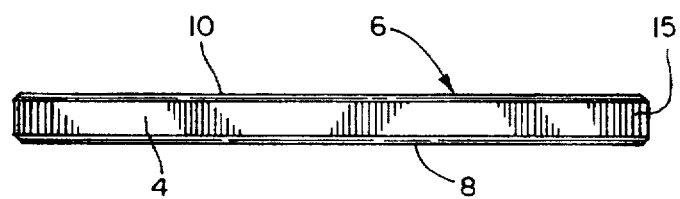
FIG. 2 is a top view of the plaque structure in FIG. 1.
Figure 3:
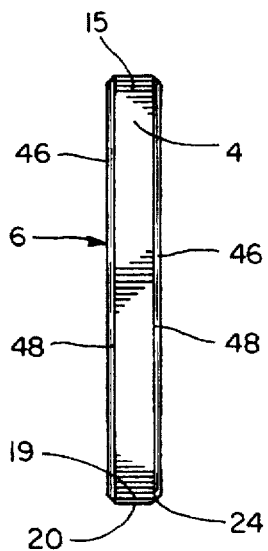
FIG. 3 is a side view of the plaque structure in FIG. 1.
Figure 4:
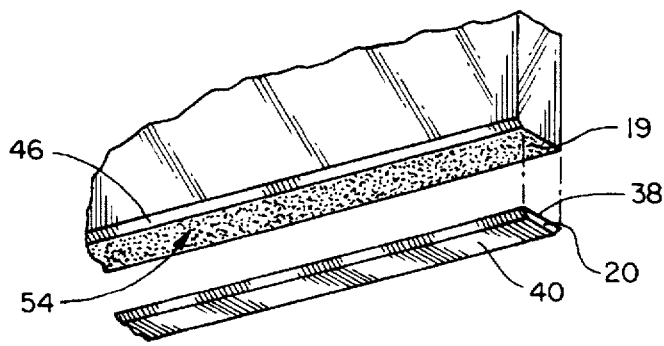
FIG. 4 is an enlarged fragmentary bottom corner view of the plaque structure in FIG. 1 where a colored glass strip structure is not yet bonded to a colorless transparent glass blank that together from my plaque structure in FIG. 1.

Referring now to the drawings, FIG. 1 shows my new and improved ambient lighted plaque structure 2 with self-created aesthetic illusory-colored sides 4. The plaque structure 2 comprises a colorless transparent glass blank 6. The glass blank 6 is preferably a homogeneous composition of silica or silica materials of a pure enough concentration of silica or silica materials to obtain transparent substantially colorless glass. Specifically, excellent results are obtained when the glass blank 6 is a plate glass of the kind manufactured and sold by Pittsburgh Paint and Glass (PPG) under the trademark "Star Fire" plate glass. Alternatively, the glass blank 6 may also be constructed from other types of glass such as, crystal-type glass containing a specific lead or other mineral content, or optical glass or other transparent colorless glass materials as long as the transparent glass material is primarily manufactured from silica or silica containing components. These other transparent glass materials can be used to practice my claimed invention but they are a higher quality glass and thus more expensive to use in the practice of my invention.

The glass blank 6 is bounded by the front surface 8, the back surface 10 and a series of angularly related sides 12. In one embodiment, as seen in FIG. 1–4 inclusive, utilizing the "Star Fire" plate glass, the glass blank 6 has the front surface 8 substantially parallel to the back surface 10. Thus, the sides 12 define a substantial uniform thickness between the front and back surfaces 8 and 10 respectively.

When using plate glass for the glass blank 6, the plate glass sold under the trademark "Star Fire", is sold in 65 inch by 130 inch sheets that are ½ inch, ⅝ inch or ¾ inch thick. The present invention can be practiced equally well utilizing any of these thicknesses in the range of ¼ inch to 1 inch. However, superior results are obtained when the glass blank 6 is constructed with ¾ inch plate glass and the base member 42 is constructed from ½ inch plate glass, if a glass material is used to form the base member. In an alternative embodiment of my invention, the front surface 8 and the back surface 10 do not have to be parallel to one another and in fact may be obelisk-like in relation to one another.

The series of angularly related sides 12 are further defined as facing in an upward direction 16 or in a downward direction 18. Because a side 17 may be positioned exactly vertical, i.e., geometrically facing neither upward nor downward relative to the upward and downward directions 16 and 18 respectively, it is resolved that any side 17 not facing in the downward direction 18 is defined to be facing in the upward direction 16.

My invention can take on many shapes, including flat-type sides 12 as seen in FIGS. 1–9 inclusive, as well as curved or rounded sides, not specifically shown, provided at least one side 19 of the glass blank 6 is flat so that a colored glass strip structure 20 can be bonded thereto. At least one flat-type side 19 is needed because curved-type colored glass strip structures are not available in the marketplace.

The colored glass strip structure 20 is bonded to at least one side 19 facing in a downward direction 18. The bond between the side 19 and the colored glass strip structure 20 must create a transparent joint 24 therebetween, the transparent joint 24 providing a near permanent and rigid bond between the downward side 19 and the colored glass strip structure 20. It is preferred if the transparent joint 24 is also colorless so that the joint 24 will not interfere with the coloring effect of the colored glass strip structure 20, as hereafter described. Also, superior results are obtained when the transparent joint 24 substantially bonds each and every point of the side 19 to each and every corresponding confronting point of the colored glass strip structure 20. The transparent joint 24 then enables light to travel between the colored glass strip structure and the side 19 without substantial internal reflection as light travels between the glass strip structure 20 and the side 19.

In other words, when ambient light from an independent light source 26, not shown but being light from any source natural or artificial, travels through the glass blank 6 it is able to pass out of the glass blank 6, through the transparent joint 24 and into the glass strip structure 20 without the prior art effect of near total internal reflection of the ambient light. Without the transparent joint 24, established laws of light mechanics dictate that ambient light entering from the front and back surfaces 8 and 10 will travel to a side 19 of glass blank 6. From there the light will try to travel out of the glass blank into a layer of air between the side 19 and the glass strip structure 20. However, the index of refraction for the light is such that the light will be near totally internally reflected causing the side 19 to be mirror-like when viewed from the front or back surfaces and preventing light from traveling through the side 19 towards the glass strip structure 20.

The transparent joint 24 provides a continuous homogeneous-like path between the side 19 facing in a downward direction 18 and the colored glass strip structure 20 thereby eliminating the effect of the index of refraction. Consequently, when ambient light enters the glass blank from front and back surfaces, as well as the series of angularly related sides, it travels through the glass blank, out of the side 19, through the transparent joint 24 and then to the colored plate glass strip structure 20. Upon encountering the strip structure, established laws of light mechanics dictate that some light will pass through the strip structure, as it is transparent, and some light will be reflected off of the strip structure and back through the transparent joint 24 and into the glass blank 6. The reflected light then causes a side 15 facing in an upward direction 16 to be illusory-colored as the light travels out of the side 15 and is refracted into the air surrounding the glass blank.

Figure 9:
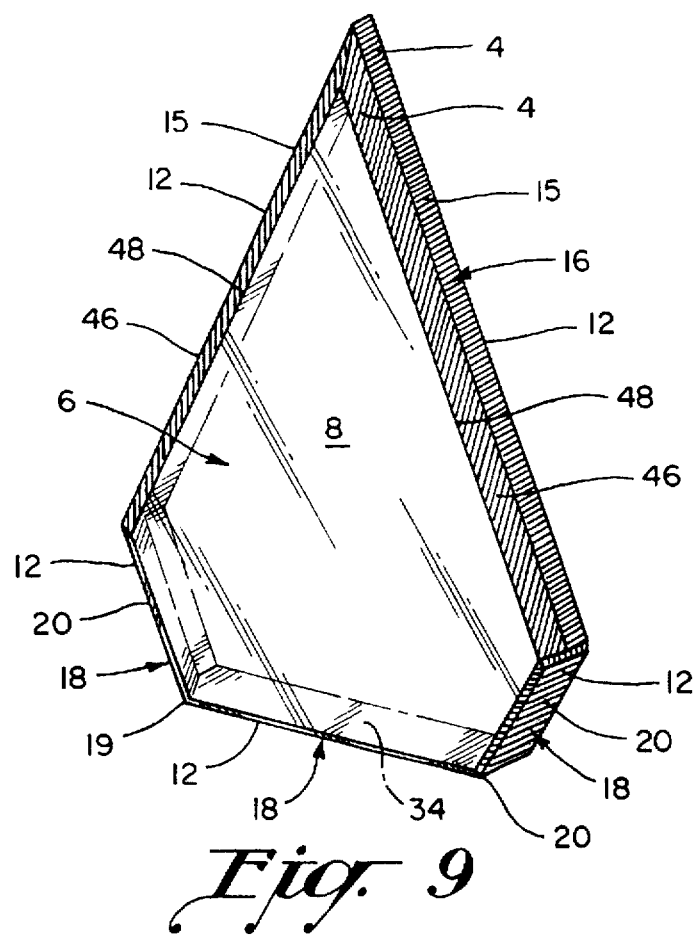
FIG. 9 is a front perspective view of another embodiment of my plaque structure with a multi-piece colored glass strip structure.
Figure 10:
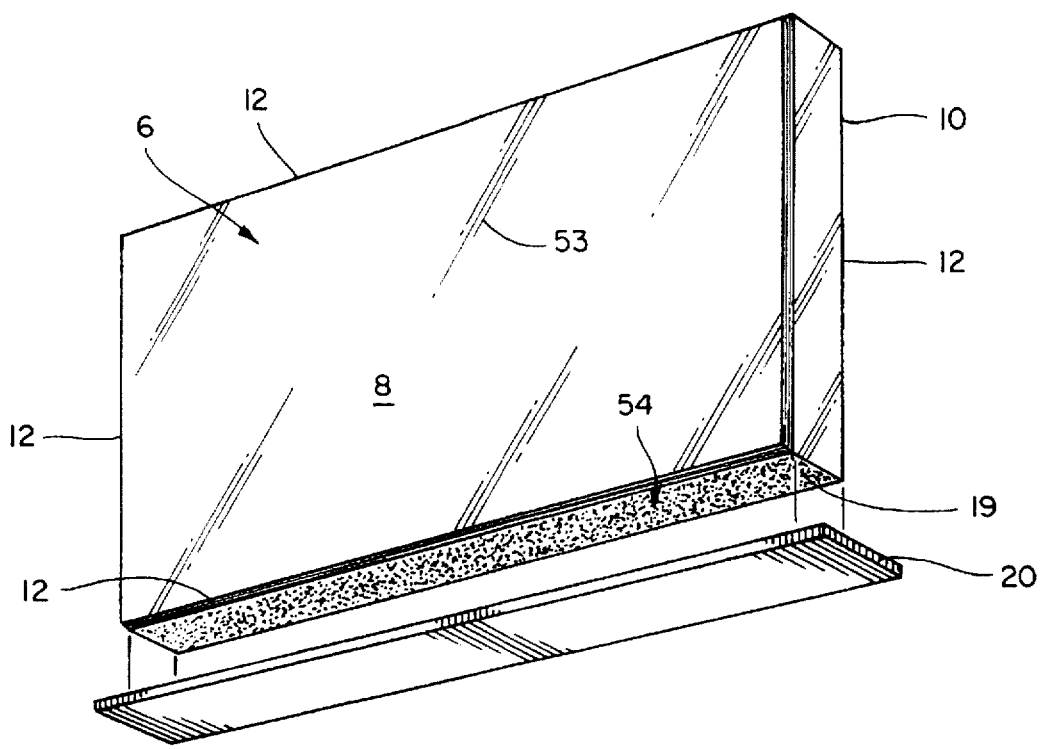
FIG. 10 is a front perspective view of a preliminary step in the process of making my plaque structure in FIG. 1.
Figure 11:
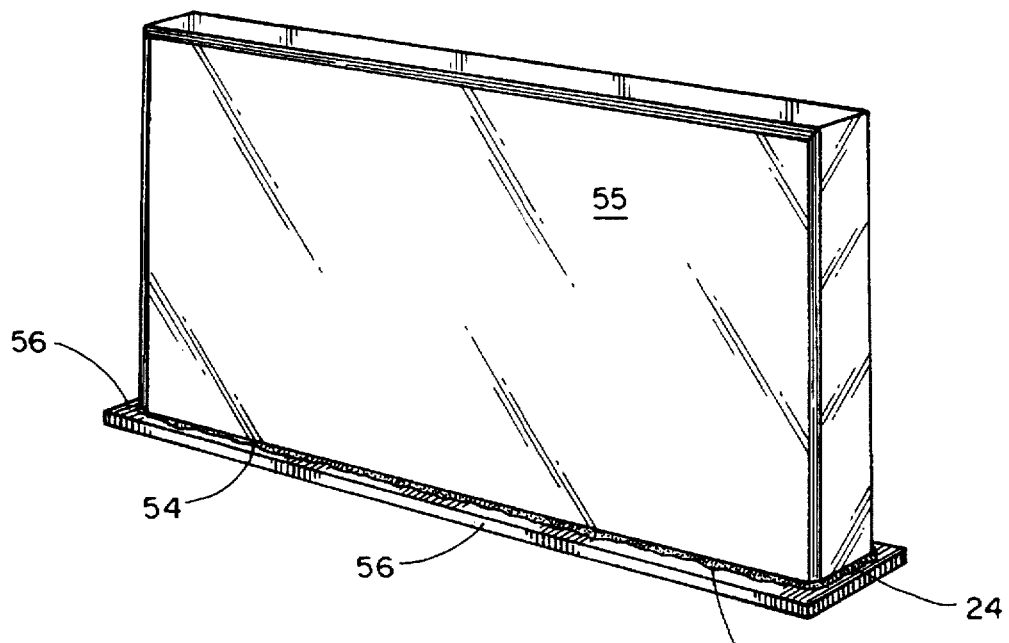
FIG. 11 is a front perspective view of the gluing and curing steps in the process of making my plaque structure in FIG. 10.
Figure 12:
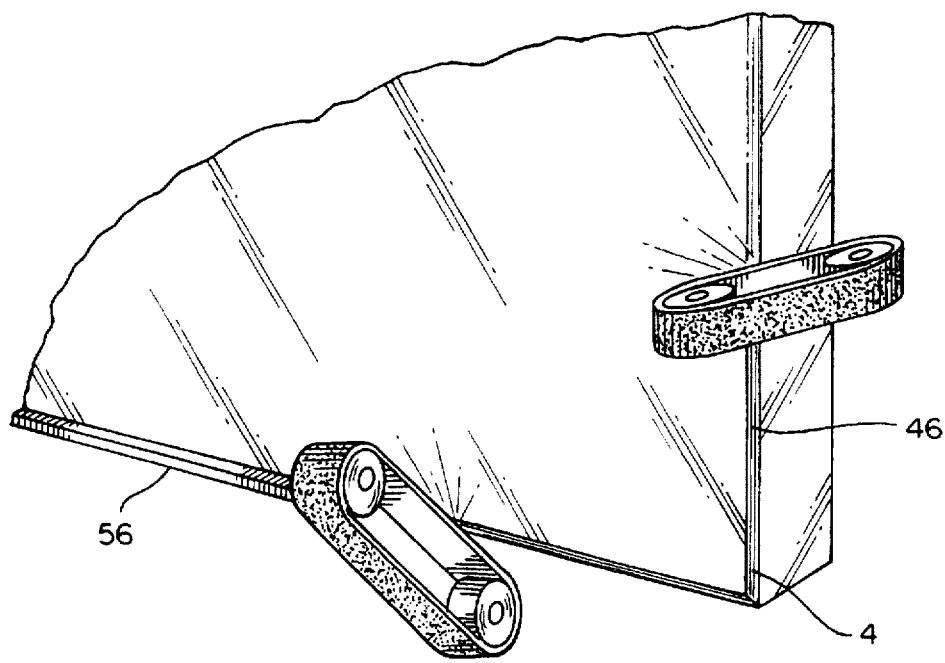
FIG. 12 is an enlarged fragmentary front bottom corner view of the plaque structure in FIG. 11 after the curing step and now showing the beginning of the machining, beveling and polishing steps in the process of making my plaque structure; and, FIG. 13 is a back perspective view of the engraving step in the process of making my plaque structure in FIG. 10.
Figure 13:
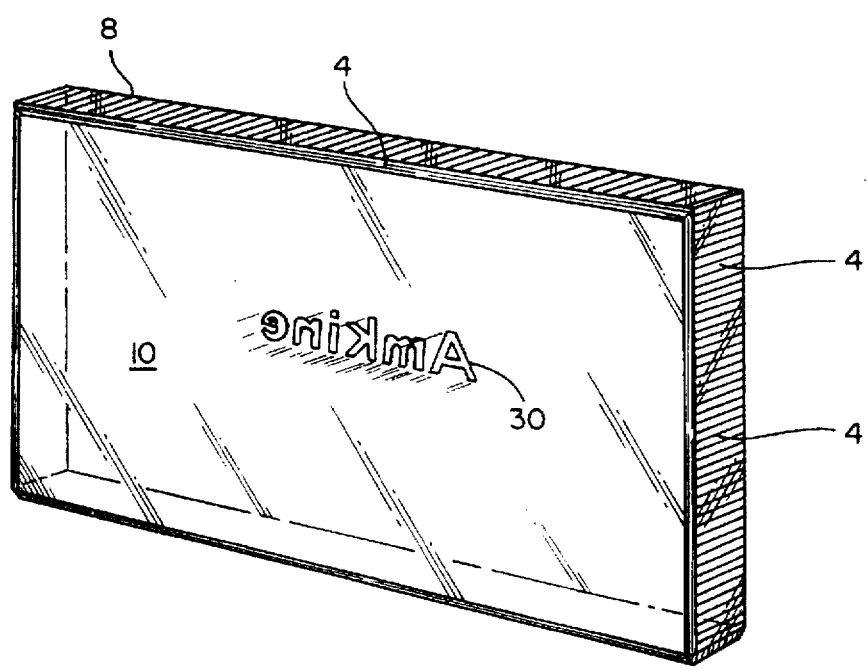

In another embodiment of my invention as disclosed in FIG. 9, the strip structure 20 is preferably bonded to each side 19 facing in a downward direction 18. In this way, superior illusory-colored sides 4 are obtained, as hereafter described in detail. Consequently, my plaque structure 2 may take on other shapes not here specifically disclosed in the drawings and it is understood that to obtain superior illusory-colored sides 4 the strip structure 20 is preferably bonded to each side 19 facing in a downward direction 18.

Excellent results are obtained when an ultraviolet curable glue is used to bond the side 19 and the colored glass strip structure 20. Particularly, excellent results are obtained when the ultraviolet curing glue sold under the trade name "Loctite Impruv LV Potting Compound" by the Loctite Company is used. When this ultraviolet glue is used then the side 19 bonded to the glass strip structure 20 must be exposed to ultraviolet light for a specified period of time ranging from 15 seconds to 5 minutes, depending on the source of ultraviolet light utilized. Another significant advantage of the "Loctite Impruv LV Potting Compound" is that bonding the side 19 and the glass strip structure 20 can be done at any room temperatures, preferably in the range of 60 degrees F. to 80 degrees F.

Another glue that may be available to practice my invention, and which does not need ultraviolet light for curing, is "Loctite Super Glue Gel" but the results of this product are not known to be superior to that of "Loctite Impruv LV Potting Compound".

The colored glass strip structure 20 has a top surface 38 and a bottom surface 40. The strip structure is preferably a homogeneous composition of silica or silica materials of a pure enough concentration of silica or silica materials to obtain transparent glass of a predetermined single color. It should be understood that the glass for the glass strip structure 20 may be translucent or opaque but that superior coloring is obtained when the glass strip structure 20 is a transparent glass strip structure. The coloring effect of the strip structure is dependent on both the color of the glass itself as well as the thickness of the strip structure. Excellent results are obtained when the thickness of the strip structure is 1/10 of an inch, but other thickness may be utilized. Also, it is preferred that the strip structure have a uniform thickness obtained by plate glass so that the coloring effect caused thereby is uniform throughout. Excellent results are obtained when the top and bottom surfaces 38 and 40 respectively are within ±0.005 inch of uniform flatness across each of the surfaces to enable the creation of a superior transparent joint 24 therebetween. Finally, maximum illusory coloring is obtained when the colored glass strip structure is sized to substantially cover the side 19 so that each point on the side 19 will contribute to the illusory coloring effect disclosed herein.

Similarly, it is preferred that the side 19 bonded to the colored glass strip structure 20 also have a uniform flatness in the range of ±0.005 inch for the reasons just stated. It should be understood that other types of glue for bonding the side 19 and the colored glass strip structure 20 may allow a greater range of flatness on the side 19 and the colored glass strip structure 20 and still practice my claimed invention.

Indicia 30 may be engraved on the front or back surface 8 or 10 respectively of the glass blank 6. When such indicia are engraved on one of the front or back surfaces another significant feature of my invention is the glass blank 6 having a colorless transparent read through capacity from the front surface 8 to the back surface 10. This colorless read through capacity enhances the viewing of the indicia as opposed to a colored glass blank, not shown, that would have a colored read through capacity which hinders the viewing of the indicia on the surface of the glass blank.

Figure 6:
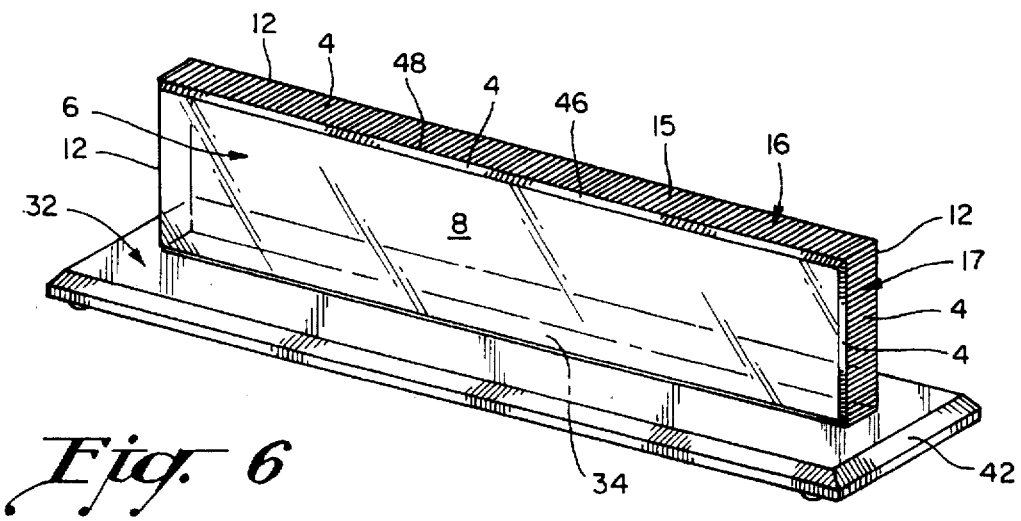
FIG. 6 is a front perspective view of a preferred embodiment of my plaque structure with a separate base member attached thereto.
Figure 7:
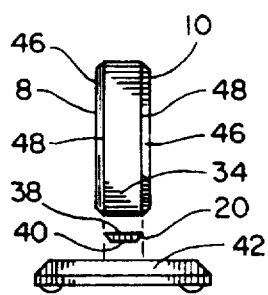
FIG. 7 is a side view of the plaque structure in FIG. 6, and showing a stacked relationship between separate members of my plaque structure.
Figure 8:
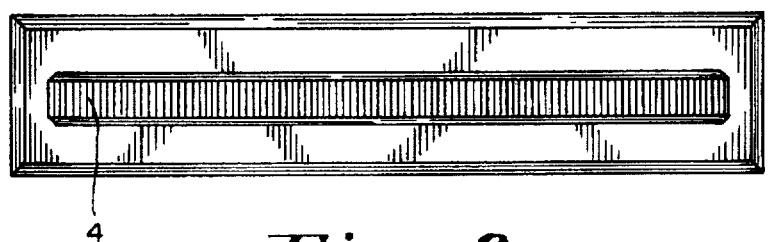
FIG. 8 is a top view of the plaque structure in FIG. 6.

In the preferred embodiment of my invention as disclosed in FIGS. 6–8, a support structure 32 supports a bottom portion 34 of the colorless transparent glass blank 6, where the support structure is substantially perpendicular to the front and back surfaces of the glass blank 6. Excellent results are obtained when the support structure 32 comprises a base member 42 rigidly attached to the bottom portion 34 in stacked relation underlying the glass strip structure 20. The base member 42 may be a material from the group consisting of glass, crystal or wood. When the base member 42 is a preferred glass material, excellent results are obtained when the bonding materials disclosed previously for bonding the side 19 and the colored glass strip structure 20 are used to rigidly attach the base member 42 to the bottom portion 34.

In an alternative embodiment of my invention as disclosed in FIGS. 1–5, if the glass blank 6 is of such a size that the side 19 in the bottom portion 34 is sufficient to maintain the glass blank 6 in an upright position relative to the bottom portion then the base member 42 is not necessary. Further, in this situation, the bottom portion 34 of the glass blank 6 is the glass blank's own self provided support structure 32.

If desired, a beveled edge 46 traverses a length 48 of one of the series of angularly related sides 12. The beveled edge 46 is located between one of the series of angularly related sides and the front surface 8 or back surface 10. Preferably, a beveled edge 46 is located between each of the series of angularly related sides and the front surface 8 or back surface 10, respectively. The beveled edge 46 is aesthetic illusory-colored 4 when ambient light from an independent light source 26, not shown, passes into the glass blank 6 and reflects off of the glass strip structure 20 and refracts externally of the respective beveled edge 46 causing the beveled edge to be aesthetic illusory-colored. Further, the very same ambient light that causes the beveled edge 46 to be aesthetic illusory-colored leaves the front and back surfaces of the glass blank having a colorless transparent read through capacity from the front surface to the back surface. Also, due to the established principles of light mechanics, some ambient light from an independent light source 26, not shown, passes into the glass blank 6 and reflects off of the glass strip structure 20 and may reflect internally of the respective beveled edge 46, due to the index of refraction, and then exit the front and back surfaces 8 and 10, causing the beveled edge to be aesthetic illusory-colored from within.

Figure 5:
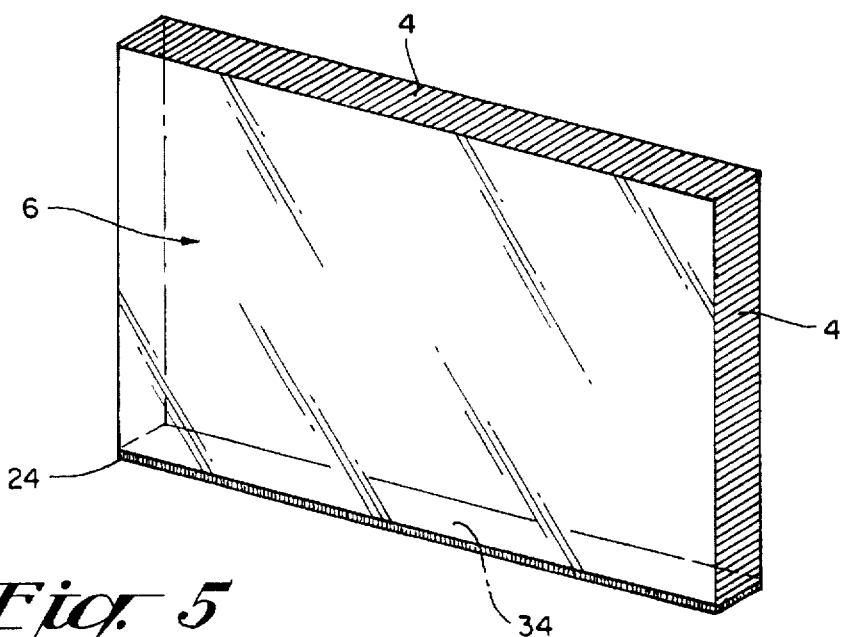
FIG. 5 is a front perspective view of another embodiment of my plaque structure before a beveled edge is machined thereon and before indicia are engraved thereon.

In another embodiment of my invention as disclosed in FIG. 5, the glass blank 6 does not have the preferred beveled edges 46 as disclosed in FIGS. 1–4 and 6–9. It should be understood that this embodiment still practices my invention with all the features and advantages previously disclosed but just without the enhancement of aesthetic illusory-colored beveled edges 46.

Another part of my invention involves the process of making the ambient lighted plaque structure with self-created aesthetic illusory-colored sides, as disclosed in FIGS. 10–13. In this connection, I begin by providing an unfinished colorless transparent glass blank 6 bounded by front and back surfaces 8 and 10 and a series of angularly related sides 12. This unfinished glass blank 6 is preferably obtained by cutting the glass blank from a large sheet of Pittsburgh Paint and Glass (PPG) "Star Fire" plate glass measuring 65 inches by 130 inches and being ¾ inch thick.

Next I finish one of the series of angularly related sides 12 to create a downward side 19 having a uniform flatness across the surface thereof. The side 19 may have a smooth unpolished finish as appearing at 53 or it may be a polished finish as appearing at 55. The smooth unpolished finish 53 is preferred to the polished finish 55 only because less manufacturing time is required to obtain the smooth unpolished finish 53. It should be understood that either finish 53 or 55 can be used to employ the advantages of my invention, the critical feature being that the downward side 19 have a uniform flatness across the surface thereof.

Then, I apply a bead of glass-type bonding glue 54 longitudinally across the downward side 19. Next, I place the colorless transparent glass blank 6 on top of a colored glass strip structure 20 where the glue 54 is located in between the downward side 19 and the colored glass strip structure 20.

It is critical to create a continuous joint 24 by applying pressure to the glass blank 6 sufficient to cause the glue 54 to ooze out from between the downward side 19 and the colored glass strip structure 20 eliminating substantially all air bubbles from being located in the glue. The preferred method of applying sufficient pressure is using manual pressure.

Next, the glue must be cured, and preferably by exposure to ultraviolet light for 15 seconds to 5 minutes, as disclosed previously. When cured the glue causes the joint 24 to be colorless and transparent and creates a rigid and near permanent bond between the downward side 19 and the colored glass strip structure 20. Further, this bond then enables light from an independent light source 26, not shown, to travel between the colored glass strip structure 20 and the colorless transparent glass blank 6 via the transparent joint 24 without substantial internal reflection and thereby self-creating aesthetic illusory-colored sides 4 of the glass blank 6. Moreover the ambient light leaves the front and back surfaces 8 and 10 of the glass blank 6 having a colorless transparent read through capacity from the front surface to the back surface.

Finally, the rough edges 56 of the colored glass strip structure 20 are machined to be flush with respective front and back surfaces and respective sides of the series of angularly related sides, as disclosed in FIG. 5

Once the colorless transparent glass blank 6 has been cured and bonded to the colored glass strip structure 20 and then machined, the process comprises the additional steps of: cleaning off the glue 54 that oozed out from between the downward side 19 and the colored glass strip structure 20 and then impart a polished finish to the front and back surfaces and the series of angularly related sides of the colorless transparent glass blank.

For additional aesthetic features, the process comprises the additional steps of: beveling an edge 46, where the edge 46 is located between at least one side of said series of angularly related sides and the front or back surface respectively; causing the beveled edge 46 to be aesthetic illusory-colored when ambient light from the independent light source 26 passes into the colorless transparent glass blank 6 and reflects off of the colored glass strip structure 20 and refracts externally of the beveled edge 46; and, leaving the front and back surfaces 8 and 10 of the colorless transparent glass blank 6 having a colorless transparent read through capacity from the front surface to the back surface.

Additional aesthetic features are obtained when the process comprises the additional step of: engraving indicia 30 on one of the front and back surfaces.

Finally, additional aesthetic and utilitarian features are obtained when the process further comprises the step of: assembling a base member 42 with the colorless transparent glass blank 6 and the colored glass strip structure 20 in stacked relation therewith, the base member 42 underlying the colored glass strip structure 20 and thereby supporting a bottom portion 34 of the colorless transparent glass blank 6 in a substantially perpendicular position relative to the base member.

It is preferred to do the machining, beveling and polishing after curing the glue and bonding the colorless transparent glass blank 6 on top of a colored glass strip structure 20. In this way these steps do not have to be repeated after the curing and bonding steps to insure that the glass strip structure 20 is flush with respective front and back surfaces 8 and 10 and respective sides of the series of angularly related sides 12, and, also so that the glass strip structure 20 will have similar beveled edges 46, should beveled edges by desired. Further the rough edges 56 are fragile and susceptible to breaking in machined before the glass strip structure 20 is bonded to the glass blank 6.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. An ambient lighted plaque structure with self-created aesthetic illusory-colored sides comprising:

a colorless transparent plate glass blank;

said colorless transparent plate glass blank being homogeneous in composition;

the colorless transparent plate glass blank bounded by front and back surfaces substantially parallel to one another and a series of angularly related sides substantially perpendicular to said front and back surfaces;

said series of angularly related sides defining a substantially uniform thickness in the range of ¼ inch to 1 inch between the front and back surfaces thereof;

one of said series of angularly related sides facing in an upward direction;

another of said series of angularly related sides facing in a downward direction;

a colored plate glass strip structure underlying said colorless transparent plate glass blank;

said colored plate glass strip structure being homogeneous in composition;

bonding means for rigidly bonding said colored plate glass strip structure to the side facing in a downward direction;

said bonding means providing a colorless transparent joint between the colored plate glass strip structure and the side facing in a downward direction, said transparent joint enabling ambient light to travel between the colored plate glass strip structure and the side facing in a downward direction without substantial internal reflection as the ambient light travels between the colored plate glass strip structure and the side facing in a downward direction;

said colored plate glass strip structure sized to substantially cover the side facing in a downward direction;

the side facing in an upward direction being aesthetic illusory-colored when ambient light from an independent light source passes into the colorless transparent plate glass blank and reflects off of the colored plate glass strip structure and refracts externally of the side facing in an upward direction causing said side to be aesthetic illusory-colored and leaving the front and back surfaces of the colorless transparent plate glass blank having a colorless transparent read through capacity from the front surface to the back surface;

indicia engraved on the back surface of the colorless transparent plate glass blank; and, a support structure for supporting a bottom portion of the colorless transparent plate glass blank, said support structure being substantially perpendicular to the front and back surfaces of the colorless transparent plate glass blank.

2. The plaque structure of claim 1, wherein the bonding means comprises a liquid glue curable at room temperatures in the range of 60 degrees F. to 80 degrees F., said glue when cured forming the colorless transparent joint enabling ambient light to travel between the colored plate glass strip structure and the side facing in a downward direction without substantial internal reflection as the ambient light travels between the colored plate glass strip structure and the side facing in a downward direction.

3. The plaque structure of claim 1, wherein said colored plate glass strip structure has a substantial uniform thickness and may comprise a multiplicity of different colors.

4. The plaque structure of claim 3, wherein said colored plate glass strip structure has top and bottom surfaces facing away from each other, said surfaces being substantially parallel to one another and each of said surfaces being within ±0.005 inches of uniform flatness across each of said surfaces.

5. The plaque structure of claim 1, wherein the another of said series of angularly related sides facing in a downward direction is within ±0.005 inches of uniform flatness across said side.

6. The plaque structure of claim 1, wherein the support structure comprises a base member rigidly attached to a bottom portion of the colorless transparent plate glass blank in stacked relation underlying the colored plate glass strip structure, said base member being a material from the group consisting of glass, crystal and wood.

7. The plaque structure of claim 1, wherein a beveled edge traverses a length of one of said series of angularly related sides, the beveled edge lying between said side and the front surface of the colorless transparent plate glass blank, the beveled edge being aesthetic illusory-colored when ambient light from an independent light source passes into the colorless transparent plate glass blank and reflects off of the colored plate glass strip structure and refracts externally of the beveled edge causing said beveled edge to be aesthetic illusory-colored and said ambient light leaving the front and back surfaces of the colorless transparent plate glass blank having a colorless transparent read through capacity from the front surface to the back surface.

8. The plaque structure of claim 7, wherein said beveled edge is aesthetic illusory-colored when ambient light from an independent light source passes into the colorless transparent plate glass blank and reflects off of the colored plate glass strip structure and reflects internally off said beveled edge before passing externally of said front and back surfaces of said colorless transparent plate glass blank thereby causing said beveled edge to be aesthetic illusory-colored and said ambient leaving the front and back surfaces of the colorless transparent plate glass blank having a colorless transparent read through capacity from the front surface to the back surface.

9. The plaque structure of claim 1, wherein a beveled edge traverses a length of one of said series of angularly related sides facing in an upward direction, the beveled edge lying between said side and the back surface of the colorless transparent plate glass blank, the beveled edge being aesthetic illusory-colored when ambient light from an independent light source passes into the colorless transparent plate glass blank and reflects off of the colored plate glass strip structure and refracts externally of the beveled edge causing said beveled edge to be aesthetic illusory-colored and said ambient light leaving the front and back surfaces of the colorless transparent plate glass blank having a colorless transparent read through capacity from the front surface to the back surface.

10. The plaque structure of claim 9, wherein said beveled edge is aesthetic illusory-colored when ambient light from an independent light source passes into the colorless transparent plate glass blank and reflects off of the colored plate glass strip structure and reflects internally off said beveled edge before passing externally of said front and back surfaces of said colorless transparent plate glass blank thereby causing said beveled edge to be aesthetic illusory-colored and said ambient light leaving the front and back surfaces of the colorless transparent plate glass blank having a colorless transparent read through capacity from the front surface to the back surface.

11. An ambient lighted plaque structure with self-created aesthetic illusory-colored sides comprising:

a glass blank;

said glass blank being colorless and transparent;

said glass blank being homogeneous in composition;

the glass blank bounded by front and back surfaces and a series of angularly related sides;

said series of angularly related sides defining a thickness between the front and back surfaces thereof;

one of said series of angularly related sides facing in an upward direction;

another of said series of angularly related sides facing in a downward direction;

a colored glass strip structure underlying said glass blank;

said colored glass strip structure being homogeneous in composition;

bonding means for rigidly bonding said colored glass strip structure to the side facing in a downward direction;

said bonding means providing a colorless transparent joint between the colored glass strip structure and the side facing in a downward direction, said colorless transparent joint enabling ambient light to travel between the colored glass strip structure and the side facing in a downward direction without substantial internal reflection as the ambient light travels between the colored glass strip structure and the side facing in a downward direction;

said colored glass strip structure sized to substantially cover the side facing in a downward direction; and the side facing in an upward direction being aesthetic illusory-colored when ambient light from an independent light source passes into the glass blank and reflects off of the colored glass strip structure and refracts externally of the side facing in an upward direction causing said side to be aesthetic illusory-colored and said ambient light leaving the front and back surfaces of the glass blank having a colorless transparent read through capacity from the front surface to the back surface.

12. The plaque structure of claim 11, wherein the bonding means comprises a liquid glue curable at room temperatures in the range of 60 degrees F. to 80 degrees F., said glue when cured forming the colorless transparent joint enabling ambient light to travel between the colored glass strip structure and the side facing in a downward direction without substantial internal reflection as the ambient light travels between the colored glass strip structure and the side facing in a downward direction.

13. The plaque structure of claim 11, wherein said colored glass strip structure has a substantial uniform thickness, said colored glass strip structure having top and bottom surfaces facing away from each other, said surfaces being substantially parallel to one another, said surfaces being of uniform flatness across each of said surfaces.

14. The plaque structure of claim 11, wherein the another of said series of angularly related sides facing in a downward direction is of uniform flatness across said side.

15. The plaque structure of claim 11, wherein a support structure comprising a base member is rigidly attached to a bottom portion of the colorless transparent glass blank in stacked relation underlying the colored glass strip structure, said base member being substantially perpendicular to the front and back surfaces of the glass blank, said base member being a material from the group consisting of glass, crystal and wood.

16. The plaque structure of claim 11, wherein indicia are engraved on one of the back and front surfaces of the glass blank.

17. The plaque structure of claim 11, wherein a beveled edge traverses a length of one of said series of angularly related sides, the beveled edge lying between said side and the front surface of the glass blank, the beveled edge being aesthetic illusory-colored when ambient light from an independent light source passes into the glass blank and reflects off of the colored glass strip structure and refracts externally of the beveled edge causing said beveled edge to be aesthetic illusory-colored and said ambient light leaving the front and back surfaces of the colorless transparent glass blank having a colorless transparent read through capacity from the front surface to the back surface.

18. The plaque structure of claim 11, wherein a beveled edge traverses a length of one of said series of angularly related sides facing in an upward direction, the beveled edge lying between said side and the back surface of the glass blank, the beveled edge being aesthetic illusory-colored when ambient light from an independent light source passes into the glass blank and reflects off of the colored glass strip structure and refracts externally of the beveled edge causing said beveled edge to be aesthetic illusory-colored and said ambient light leaving the front and back surfaces of the colorless transparent glass blank having a colorless transparent read through capacity from the front surface to the back surface.

19. A process of manufacturing an ambient lighted plaque structure with self-created aesthetic illusory-colored sides, the plaque structure utilizing light from an independent light source to create aesthetic illusory-colored sides, comprising the steps of:

providing an unfinished colorless transparent glass blank bounded by front and back surfaces and a series of angularly related sides;

finishing one of said series of angularly related sides to create a downward side having a uniform flatness across said downward side;

applying a bead of glass-type bonding glue longitudinally across the downward side;

placing the colorless transparent glass blank on top of a colored glass strip structure, the glue being located in between the downward side and the colored glass strip structure;

creating a continuous joint by applying pressure to said colorless transparent glass blank sufficient to cause the glue to ooze out from between the downward side and the colored glass strip structure eliminating substantially all air bubbles from being located in the glue;

curing the glue to cause the joint to be colorless and transparent and create a rigid bond between the downward side and the colored glass strip structure and thereby enabling light from an independent light source to travel between the colored glass strip structure and the colorless transparent glass blank without substantial internal reflection as the ambient light travels between the colored glass strip structure and the colorless transparent glass blank thereby self-creating the aesthetic illusory-colored sides of the colorless transparent glass blank and leaving the front and back surfaces of the colorless transparent glass blank having a colorless transparent read through capacity from the front surface to the back surface; and, machining rough edges of the colored glass strip structure to be flush with respective front and back surfaces and respective sides of the series of angularly related sides.

20. The process of claim 19, wherein the step of curing is:

curing the glue by exposing the glue between the downward side and the colored glass strip structure to ultraviolet light for a predetermined time period at room temperatures in the range of 60 degrees F. to 80 degrees F.

21. The process of claim 19, further comprising the steps of:

cleaning off the glue that oozed out from between the downward side and the colored glass strip structure; and imparting a polished finish to the front and back surfaces and the series of angularly related sides of the colorless transparent glass blank.

22. The process of claim 19, further comprising the step of:

beveling an edge located between one side of said series of angularly related sides and the front surface of the colorless transparent glass blank, thereby causing said beveled edge to be aesthetic illusory-colored when ambient light from the independent light source passes into the colorless transparent glass blank and reflects off of the colored glass strip structure and refracts externally of the beveled edge and leaving the front and back surfaces of the colorless transparent glass blank having a colorless transparent read through capacity from the front surface to the back surface.

23. The process of claim 19, further comprising the step of:

beveling an edge located between one side of said series of angularly related sides and the back surface of the colorless transparent glass blank, thereby causing said beveled edge to be aesthetic illusory-colored when ambient light from the independent light source passes into the colorless transparent glass blank and reflects off of the colored glass strip structure and refracts externally of the beveled edge and leaving the front and back surfaces of the colorless transparent glass blank having a colorless transparent read through capacity from the front surface to the back surface.

24. The process of claim 19, further comprising the step of:

engraving indicia on one of the front and back surfaces.

25. The process of claim 19, further comprising the step of:

assembling a base member with the colorless transparent glass blank and the colored glass strip structure in stacked relation therewith, said base member underlying the colored glass strip structure and thereby supporting a bottom portion of the colorless transparent glass blank in a substantially perpendicular position relative to the base member.

26. An ambient lighted plaque structure with self-created aesthetic illusory-colored sides comprising:

a glass blank;

said glass blank being colorless and transparent;

the glass blank bounded by front and back surfaces and a series of angularly related sides;

said series of angularly related sides defining a thickness between the front and back surfaces thereof;

one of said series of angularly related sides facing in an upward direction;

another of said series of angularly related sides facing in a downward direction;

a colored glass strip structure underlying said glass blank;

bonding means for rigidly bonding said colored glass strip structure to the side facing in a downward direction;

said bonding means providing a colorless transparent joint between the colored glass strip structure and the side facing in a downward direction, said colorless transparent joint enabling ambient light to travel between the colored glass strip structure and the side facing in a downward direction without substantial internal reflection as the ambient light travels between the colored glass strip structure and the side facing in a downward direction; and the side facing in an upward direction being aesthetic illusory-colored when ambient light from an independent light source passes into the glass blank and reflects off of the colored glass strip structure and refracts externally of the side facing in an upward direction causing said side to be aesthetic illusory-colored and said ambient light leaving the front and back surfaces of the glass blank having a colorless transparent read through capacity from the front surface to the back surface.

* * * * *